US006422373B1

(12) United States Patent
Yellop et al.

(10) Patent No.: US 6,422,373 B1
(45) Date of Patent: Jul. 23, 2002

(54) MONEY HANDLING INTERFACE AND METHOD

(75) Inventors: Andrew Michael Yellop, Sandhurst; Joelle Christine Havelaar, Reading; Kevin John Aylett, Wokingham, all of (GB)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/571,546

(22) Filed: May 16, 2000

(30) Foreign Application Priority Data

May 19, 1999 (GB) ............................................ 9911674

(51) Int. Cl.[7] ................................................ G06F 7/00

(52) U.S. Cl. ...................................................... 194/217

(58) Field of Search ................................ 194/217, 216, 194/215

(56) References Cited

U.S. PATENT DOCUMENTS 3,963,035 A * 6/1976 Levasseur ..................... 133/2
4,109,774 A * 8/1978 Hayashi ...................... 194/1 C
4,429,301 A 1/1984 Crumley et al.
4,495,485 A 1/1985 Smith
4,498,570 A 2/1985 King et al.
5,561,604 A 10/1996 Buckley et al.
5,715,925 A 2/1998 Tomioka

FOREIGN PATENT DOCUMENTS

GB 2 063 515 A * 10/1980 .......... G05B/19/02
GB 2 063 515 A 6/1981
GB 2 140 390 A 11/1984

* cited by examiner

*Primary Examiner*—Donald P. Walsh
*Assistant Examiner*—Mark J. Beauchaine
(74) *Attorney, Agent, or Firm*—Fish & Richardson P.C.

(57) ABSTRACT

A method of operating a money validator connected to a money-actuated machine through an interface carrying a plurality of price lines, comprising the steps of sensing said price lines and actuating one of said lines when sufficient money has been deposited in the validator; wherein the validator is arranged to detect at least two combinations each comprising the actuation of at least two different said price lines, and to respond differently to said combinations.

32 Claims, 8 Drawing Sheets

MONEY HANDLING INTERFACE AND METHOD

This invention relates to apparatus and methods for handling money. It will be described primarily in the context of coin handling, but the techniques of the invention can also be applied to handling other forms of currency, and in particular banknotes.

Coin or banknote validation apparatus is typically provided for integration into vending, beverage, ticket or other money actuated machinery. Such machinery includes an interface for connection to the validation apparatus, to enable the apparatus to indicate when the necessary money has been received so as to actuate the desired goods or services. Several interfaces are known. Some vending machines have relatively sophisticated processors, and use correspondingly sophisticated interfaces which can carry communications signalling of a range of data. On the other hand, many vending machines use a less sophisticated electromechanical interface.

In such an interface, typically, a plug or socket is provided for connection to the validation apparatus. The connector has a separate terminal for each different price available on the apparatus. There may, for example, be one price line, four price lines, or ten price lines. Each different type of article to be sold by the machine is uniquely associated with a button to be pressed by the user to order that item. Pressing the button changes the state of one of the price lines, with which the button is uniquely associated.

Accordingly, on sensing the price line which has been depressed by the user, the validation apparatus will await the insertion of the necessary coinage and then signal back through the interface when the necessary coinage has been deposited, by connecting the price line concerned to a common line also appearing at a terminal of the connector. The vending machine is then able, from the common line and the price line, to determine that the necessary coinage has been deposited for the selected item which is then dispensed.

Inherent in such a system is a limitation on the number of different prices which can be applied, and this in turn limits the number of different types of goods or services which can be supplied by the apparatus. These limitations could, of course, be avoided by the use of a different interface. However, the present invention is intended to provide a relatively simple modification of the existing electro-mechanical interface, to permit a greater number of possible goods or services to be used than the number of price lines provided in the interface.

Accordingly, in one aspect, the present invention provides a method of operating a money validator connected to a money-actuated machine through an interface carrying a plurality of price lines, comprising the steps of sensing said price lines and actuating one of said lines when sufficient money has been deposited in the validator; wherein the validator is arranged to detect at least two combinations each comprising the actuation of at least two different said price lines, and to respond differently to said combinations.

Thus, more goods can be selected than the number of lines. The vending machine needs to understand what has been selected. Thus, in one aspect, the present invention provides an interface circuit for a money actuated machine for connection to a money validator, said machine comprising a plurality of user-actuated selection buttons connected to corresponding price lines and means for dispensing a selected item or service in response to a signal from said money validator, comprising means for decoding at least two combinations each comprising the actuation of at least two different said price lines, and actuating said dispensing means differently in response to said combinations. By decoding combinations of buttons pressed, the vending machine needs only wait an actuation signal from the validator.

In an alternative aspect, the invention provides a method of operating a money validator connected to a money-actuated machine through an interface carrying a plurality of price lines, comprising the steps of sensing said price lines and actuating one of said lines when sufficient money has been deposited in the validator; wherein the validator is arranged to signal a greater number of selections than the number of said price lines, by actuating one of said price lines in combination with a further line normally usable for a different purpose. To receive the signals from the validator, this aspect further provides an interface circuit for a money actuated machine for connection to a money validator, said machine comprising a plurality of user-actuated selection buttons connected to corresponding price lines and means for dispensing a selected item or service in response to a signal from said money validator, comprising means for detecting which of a plurality of combinations of one of said price lines, in combination with a further line normally usable for a different purpose, is present. Thus, an un-used relay line (such as a credit or exact change relay line) can be used to increase the range of selections signalled to the vending machine.

Other aspects and preferred embodiment of the invention are as disclosed in the accompanying specification and claims, with advantages which will be apparent hereafter.

Arrangements embodying the invention will now be described by way of example with reference to the accompanying drawings, in which.

The apparatus and method of the present invention may be used for the dispensing of items including the vending of products, such as drinks, snacks, cigarettes, toiletries or tickets, currency exchange; the dispensing of beverages; and the providing of services, such as in pay telephones or turnstiles. A first embodiment of the invention is described below with reference to a product vending machine, but this is not meant to be a limitation on the application of this invention.

Figure 1:
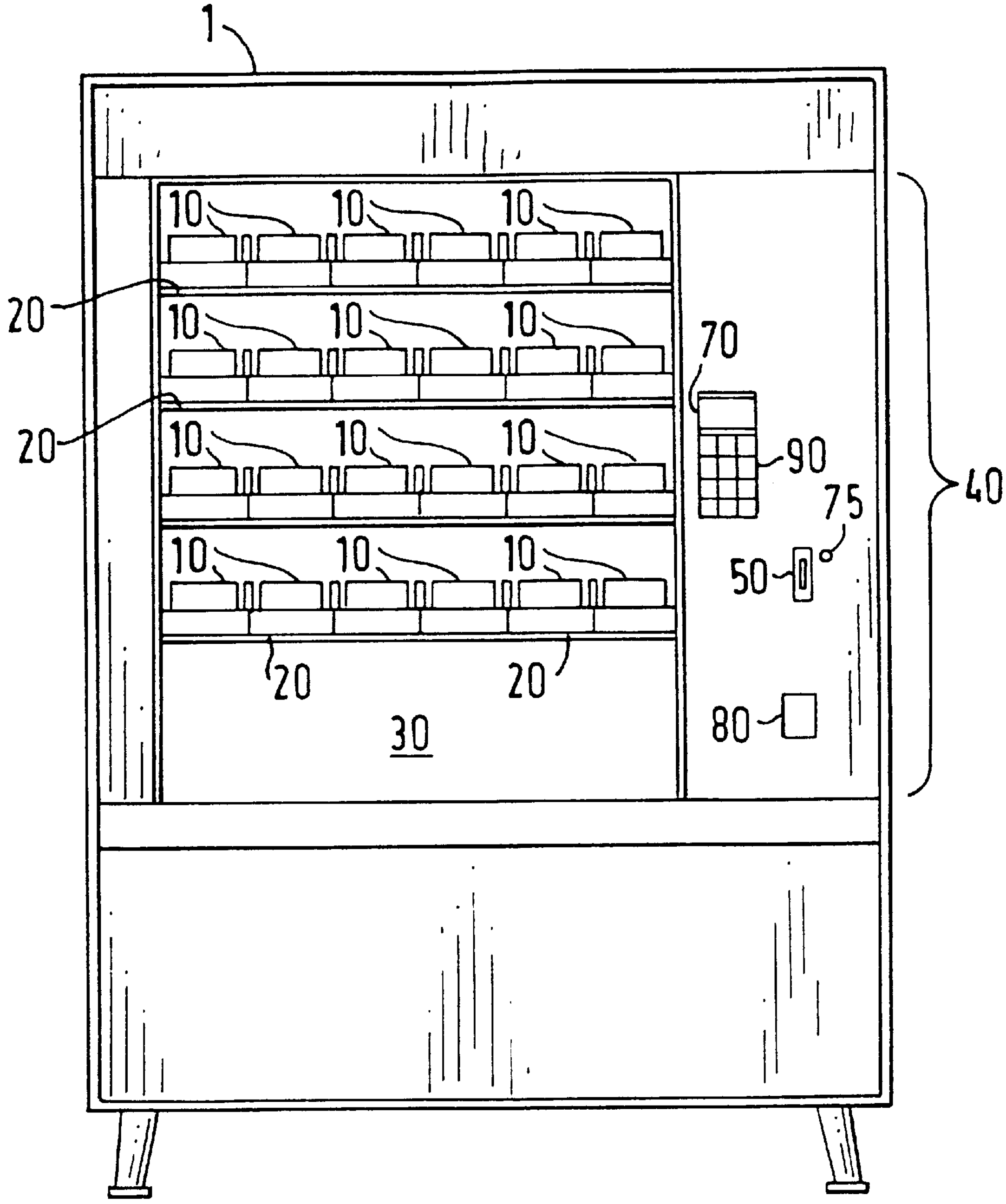
FIG. 1 is a front view of a typical vending machine which can operate according to the present invention.

FIG. 1 illustrates a vending machine 1 which contains a variety of products 10 to be dispensed which are stored in an area inaccessible to customers, such as behind a glass panel. Each product 10 is retained by a product delivery apparatus 20 which is selectively actuable to dispense the product into a delivery area 30 that is accessible to the customer. Suitable product delivery apparatus 20 includes vend motors and solenoids as well as others well known in the art. Examples of such apparatus include those described in U.S. Pat. Nos. 4,458,187 and 4,785,927, which are hereby incorporated by reference.

Each product may comprise a hot beverage cup containing required powdered drink, and sweetener and/or whitener, as required, to which hot water may be added from an urn (not shown).

A control panel 40 of the vending machine 1 contains a coin slot 50 which accepts currency to initiate a vend operation.

A coin return button 75, a coin return recess 80, and an item selector such as a keypad 90 are also provided in the control panel 40. The keypad 90 comprises a plurality of buttons 91–99 each corresponding to one of the types of items to be sold. A display 70 on the control panel 40 provides instructions and information to the customer. Suitable displays 70 include dot-matrix displays, selectively activatable message lights, an electronic scrolling message, or other displays capable of operating in the environmental conditions to which automatic transaction systems are typically exposed.

A customer may initiate a transaction by selecting a product 10 to be dispensed using the keypad 90. The customer may then deposit coins of particular denominations in the slots 50. Once sufficient payment has been deposited in the automatic transaction system, the corresponding product delivery apparatus 20 will then dispense the selected product 10 to the product delivery area 30 where it may be retrieved by the customer. Any resulting change from the transaction may be paid out through the coin return recess 80. Before instructing a vend, a customer can press coin return button 75 to obtain a refund of coins in the amount of any coins he has inserted.

Figure 2:
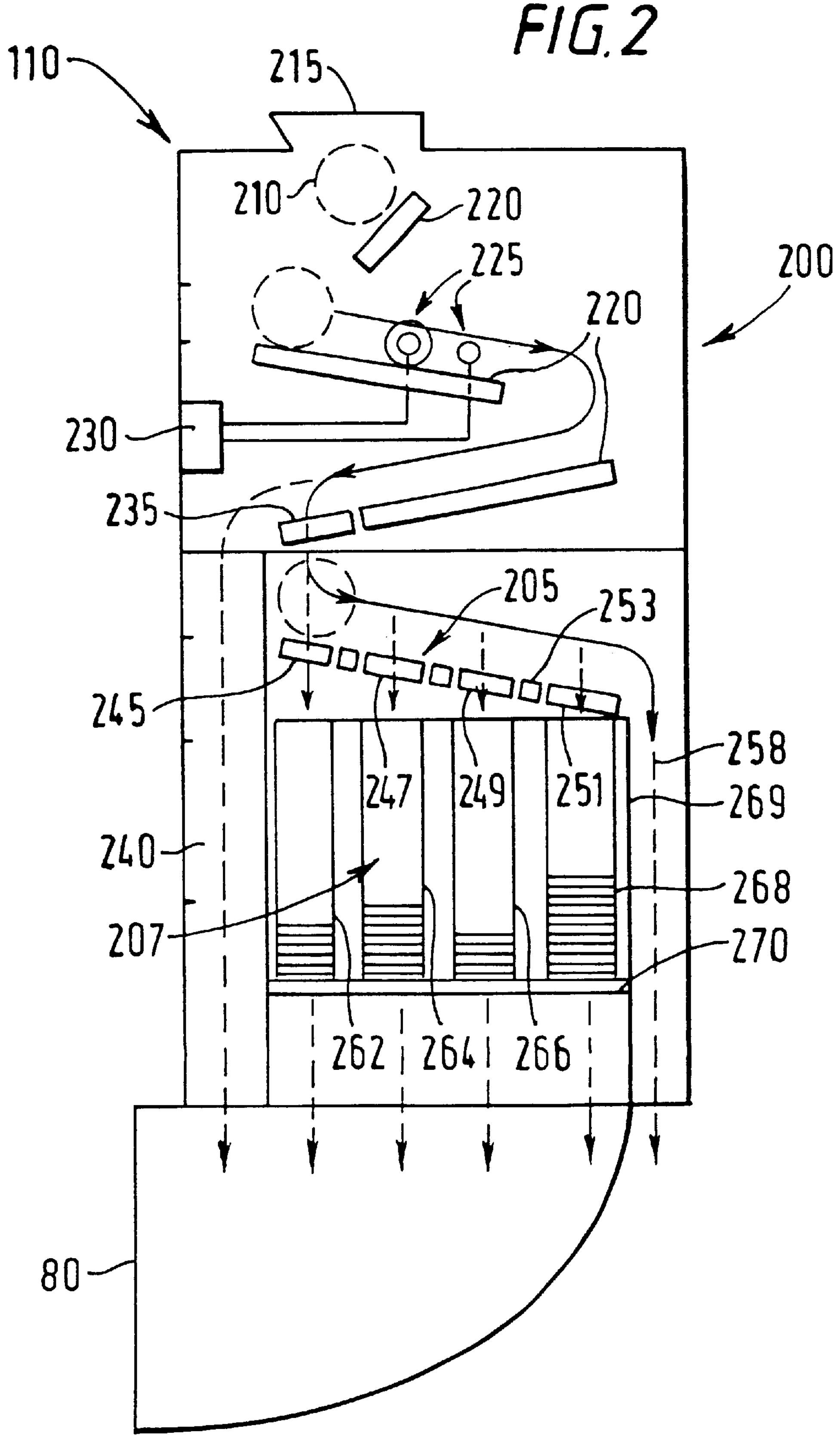
FIG. 2 is a schematic front view of a coin mechanism of the vending machine of FIG. 1.

Further details of the coin mechanism 110 are illustrated in FIG. 2. Referring to FIG. 2, coin mechanism 110 comprises a coin validator 200, a coin separator 205 and a coin storage region 207. The coin validator 200 receives inserted coins 210 through an opening 215 which is connected to the coin inlet 50. The coin 210 travels along ramp 220 in the coin validator 200 past sensors such as those shown at 225.

The sensors 225 generate electrical signals which are provided to a coin mechanism processor 230 such as a microprocessor or microcontroller. Suitable arrangements for sensors 225 include those described in GB 1 397 083, GB 1 443 934, GB 2 254 948 and GB 2 094 008 which are hereby incorporated by reference.

The processor 230 is connected to the vending machine via communications lines, to be discussed below.

The electrical signals generated by the sensors 225 contain information corresponding to the measured characteristics of the coin, such as a coin's diameter, thickness, metal content and electromagnetic properties. Based on these electrical signals, the processor 230 is able to discriminate whether the coin is acceptable, and if so, the denomination of the coin 210.

If the coin 210 is unacceptable, the processor 230 controls a gate 235 to direct the unacceptable coin 210 to a reject chute 240. The reject chute 240 is connected to the coin return recess 80 of FIGS. 1 and 2. In the alternative, acceptable coins 210 are directed to the coin separator 205 by the gate 235. The coin separator 205 may have a number of gates 245, 247, 249, 251 arranged along a ramp 253 and also controlled by signals from the processor 230, for diverting the coin 210 from the ramp 253. The coin 210 may be diverted into respective containers 262, 264, 266 and 268, or the coin 210 may be allowed to proceed along ramp 253 to a path 258 leading to a cash box (not shown).

Each of the containers 262, 264, 266 and 268 is in the form of a coin tube arranged to store a vertical stack of coins of a particular denomination. Although only four containers are shown, any number may be provided.

The coin tubes are arranged within a removable cassette 269; such removable cassettes are well known in the art. As an example, a removable cassette is described in GB 2246897 A, the contents of which are incorporated herein by reference.

The coin mechanism 110 may alternatively use passive routing techniques, such as those well known in the vending machine art, instead of the gates 245–251 for diverting the coin 210 from the ramp 253. Examples of suitable alternative configurations for the coin separator 205 are described in U.S. Pat. Nos. 3,844,297 and 4,106,610, which are hereby incorporated by reference.

A dispenser 270 associated with the coin tubes 262–268 is operable to dispense coins from the containers when change is to be given to a customer by the coin mechanism 110. The dispensed coins are delivered to the coin return recess 80 for collection. Suitable dispensers 270 include those described in U.S. Pat. Nos. 3,814,115 and 4,367,760, which are hereby incorporated by reference. An alternative configuration may use a coin mechanism 110 that does not payout change. In such a configuration, a separate preloaded coin payout device, such as those well known in the gaming machine art, may be used to payout change.

The apparatus described so far corresponds to those already known.

Figure 3:
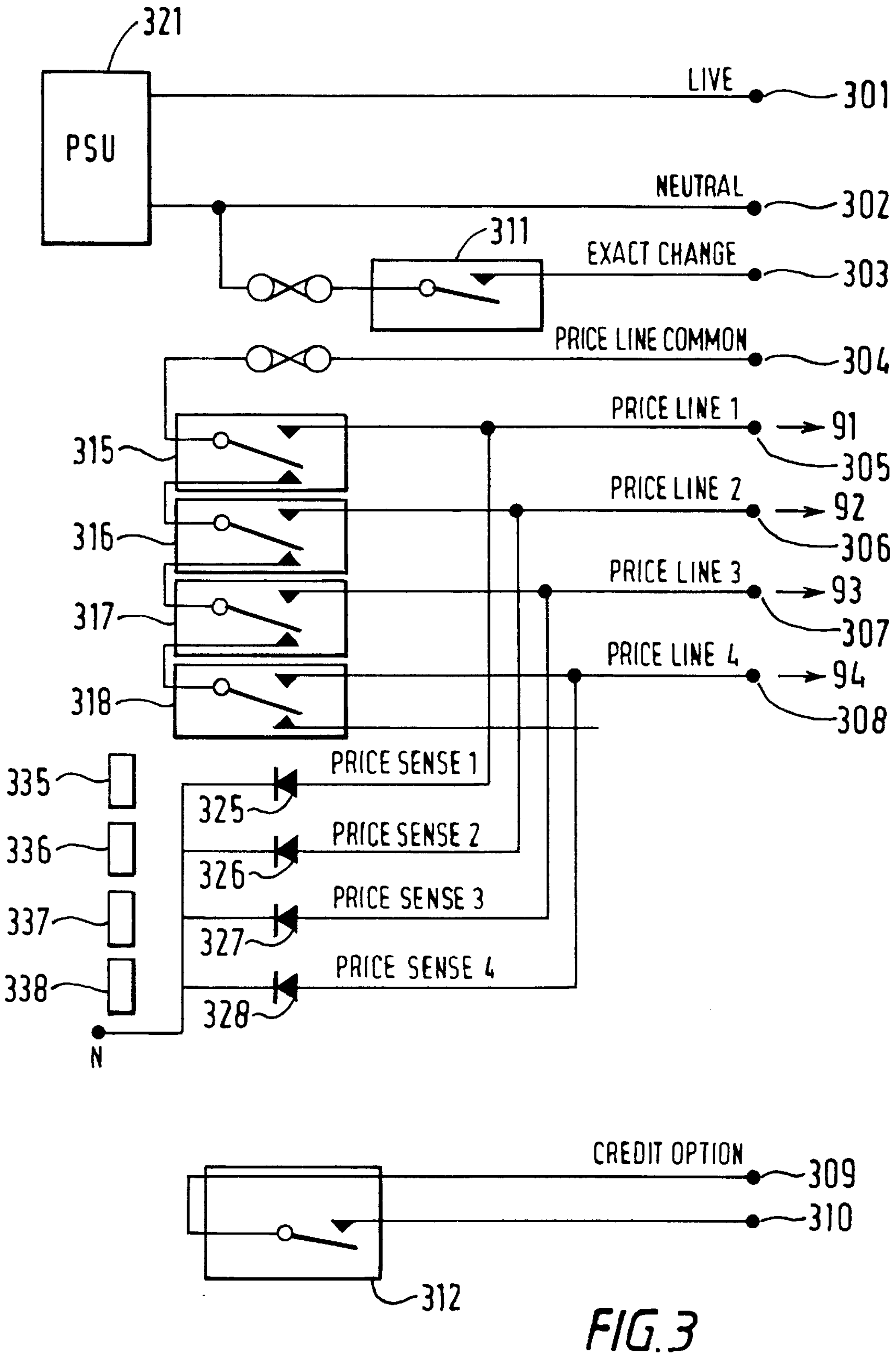
FIG. 3 illustrates the relevant parts of the coin mechanism interface to a four price line electro-mechanical interface.

The lines connecting the vending machine of FIG. 1 and the validator of FIG. 2 are provided as a multicore cable, carrying a connector which plugs into a socket on the vending machine. Each pin on the connector has a specified standardised purpose, to enable different validators to be plugged into a given vending machine. FIG. 3 illustrates a four price electro-mechanical interface; some pins are omitted for clarity. FIG. 3 also shows the components within the validator to which the line from each pin of the connector leads.

A first pair of pins 301, 302 are for live and neutral voltages respectively, and are connected to a power supply 321 of the validator.

A pin 303 is connected to a relay 311 controlled by the control unit 230 of the validator. The relay is closed on the occurrence of an "exact change" condition (i.e. a condition where the validator can no longer dispense change from the tubes 262–268), connecting the pin 303 to the neutral line from pin 302.

Pins 301–304 each carry a respective price line from the vending machine. Each is connected to the respective price line relay 315–318 controlled by the processor 230. The relays are wired in series, with the first relay 315 being connected to a common price line appearing at pin 304. Thus, when one of the relays is thrown under control of the processor 230, the corresponding price line is connected to the common terminal 304 and whichever voltage is supplied by the vending machine to the common terminal will appear at that price line terminal. It will be apparent that only one of the price lines can be connected to the common price line terminal, since throwing any one of the relays disconnects all further relays in series with it from the common price line terminal.

Each of the price lines 305–308 is also connected to the processor 230 via an optical isolator comprising a respective light emitting diode 325–328 in register with a phototransistor 335–338 connected to the processor 230.

A credit relay 312 is also provided, under control of the processor 230. When the relay is closed, it interconnects two terminals 309, 310. This may be required by some vending machines to assist in registering the credit. Where the relay itself is not provided, the validator may nonetheless provide an output signal for driving the reed solenoid of the relay.

Figure 4A:
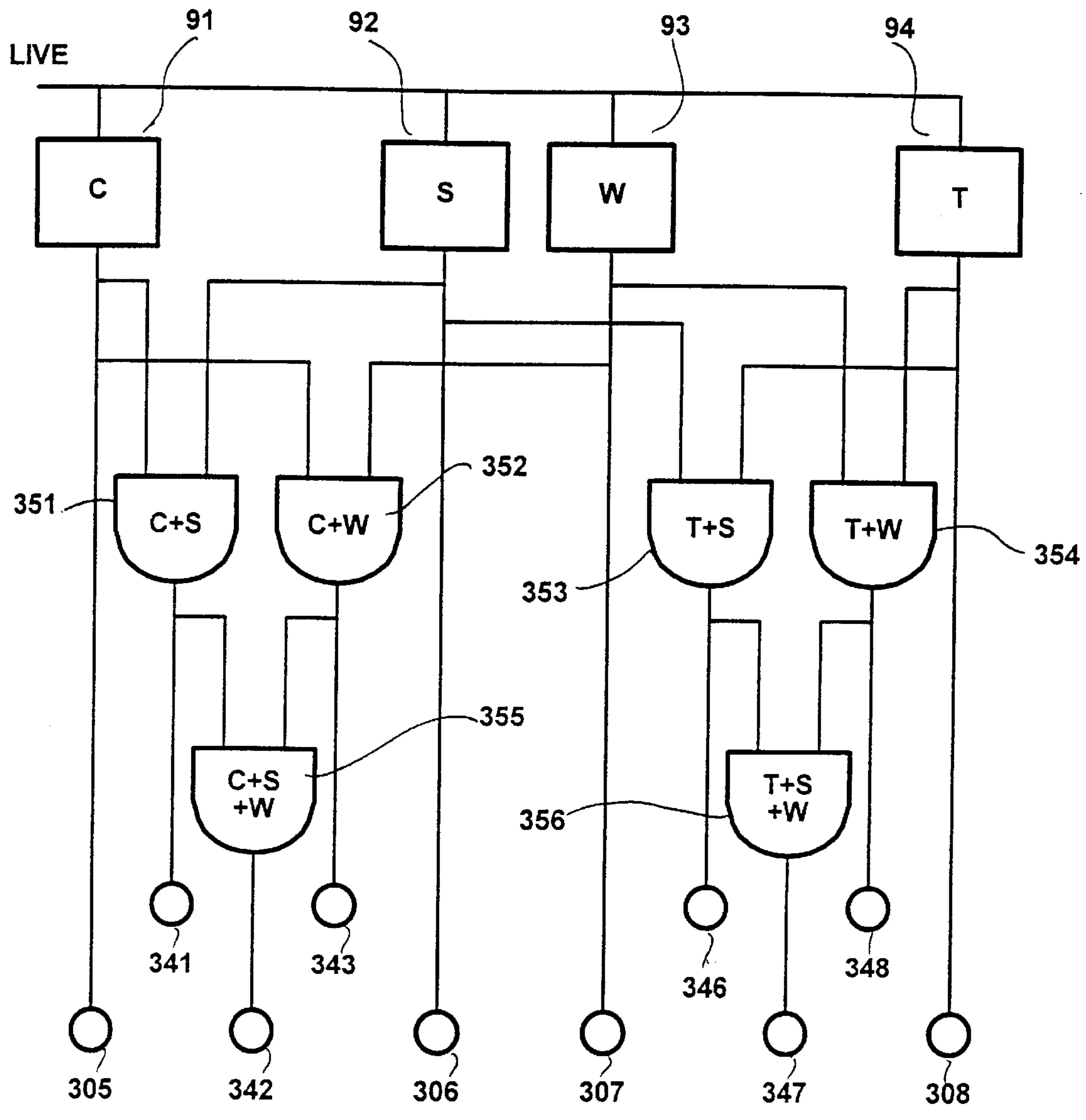
FIG. 4 (comprising FIGS. 4*a* and 4*b*) shows a logic circuit to be added to a vending machine in a first embodiment of the invention.

Each of the price lines 305–308 is, in the vending machine, connected to at least one respective button 91–94 of the keypad (see FIG. 4*a*). Each button comprises a switch, connecting its price line to either live or neutral voltage when pressed by the user. Thus, when a user presses a selection button 91–94, a corresponding voltage appears on one of the price line terminals, causing one of the light emitting diodes 325–328 to illuminate, this being detected by the processor 230 via one of the photo-transistors 335–338.

The foregoing description applies equally to the prior art as to the present embodiment. In the prior art, on detecting which price line was energised, the vending machine processor 230 determines the corresponding price of the article concerned; accumulates coins until the necessary credit has been received; and then connects the corresponding price line to the common line. The vending machine will, typically, have put a voltage on the common line. When this voltage is routed to the price line concerned, it energises the dispense solenoid for the requested item which is then dispensed.

In this embodiment, however, the vending machine is labelled to indicate to the user that in addition to the items to be selected by depressing the corresponding one of the buttons 91–94, additional items or combinations thereof can be obtained by pressing several of the buttons together. For example, the first button 91 may provide black coffee with no sugar if pressed on its own; a second 94 may provide black tea with no sugar if pressed on its own. A third button 93 may be labelled for whitener and a fourth 92 for sugar. The vending machine is labelled to indicate that pressing buttons 91 and 92 together provides black coffee with sugar; pressing buttons 91 and 93 together provides white coffee without sugar; pressing buttons 91 to 93 altogether provides white coffee with sugar; pressing buttons 94 and 93 provides white tea; pressing buttons 94 and 92 provides tea with sugar, but no whitener; and pressing buttons 92 to 94 together provides white tea with sugar.

Figure 5:
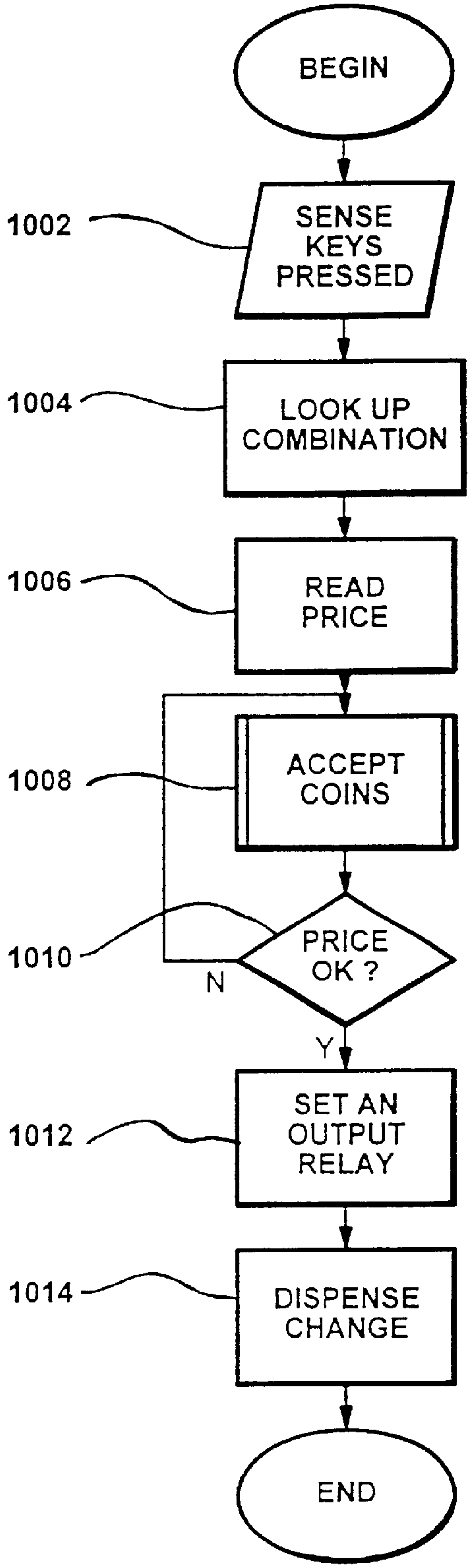
FIG. 5 is a flow diagram showing the process performed by the processor of the coin mechanism of FIG. 2 in the first embodiment.

Referring to FIG. 5, the processor 230 senses, in step 1002, the keys pressed by the user; in step 1004, looks up the record corresponding to the combination of keys; and, in step 1006, reads the stored price of the article concerned.

In a step 1008, the processor causes the validator to accept coins in well known fashion until the desired credit level has been reached (step 1010). In step 1012, one of the relays 315–318 is thrown (for reasons discussed below the identity is not important) and in step 1014, any necessary change is dispensed as disclosed, for instance, in our earlier applications GB 2269258 and GB 2284090.

It will be apparent that, by sensing combinations of price lines, many more individual items with different prices can be specified than hitherto, without changing the interface used. In fact, for N price lines, up to N factorial (N!) prices can be signalled. However, for the convenience of the user, preferably only combinations of two or, at most, three price lines will have corresponding price records stored for use by the processor 230.

It will be apparent, however, that there are still difficulties in signalling from the validator back to the vending machine since only one of the price lines can be activated at a time.

Accordingly, in this embodiment, the solution adopted is to provide a logic circuit (shown in FIGS. 4*a* and 4*b*) to permit the vending machine to directly decode the combination of buttons pressed by the user, so that the vending machine can determine which article or service to dispense.

Each of the buttons 91–94 comprises a normally open switch connected at one side to the live line, and at the other side to one of the terminals 305–308 as shown in FIG. 4*a*,. In the embodiment of a beverage dispensing machine discussed above, not all combinations of key presses are meaningful and accordingly, not all are decoded (for example, no article will be dispensed if the buttons for sugar and whitener 92, 93 are pressed together without either tea or coffee).

The coffee button 91 is connected to a first two-input AND-gate 351, the other side of which is connected to the sugar button 92. The output of the AND-gate 351 appears at a node 341, which is therefore high when buttons 91 and 92 are pressed together.

Similarly, the coffee button 91 is also connected to a input terminal of a second two input AND-gate 352, the other terminal which is connected to the whitener button 93, and the output of which appears at a port 343. The outputs of the gates 351 and 352 are also connected to the inputs of a third two input AND-gate 355, the output of which appears at a node 342 which therefore goes high when all three buttons have been pressed together.

Similarly, the tea button 94 is connected to first terminals of a pair of two input AND-gates 353, 354, the second terminals of which are connected respectively to the sugar and whitener buttons 92, 93, the outputs of which appear at nodes 346, 348, and are in turn supplied to a further two input AND-gate 356, the output of which appears at a node 347.

The nodes 305–308 pass the button presses directly to the coin validator as the user presses the buttons.

Figure 4B:
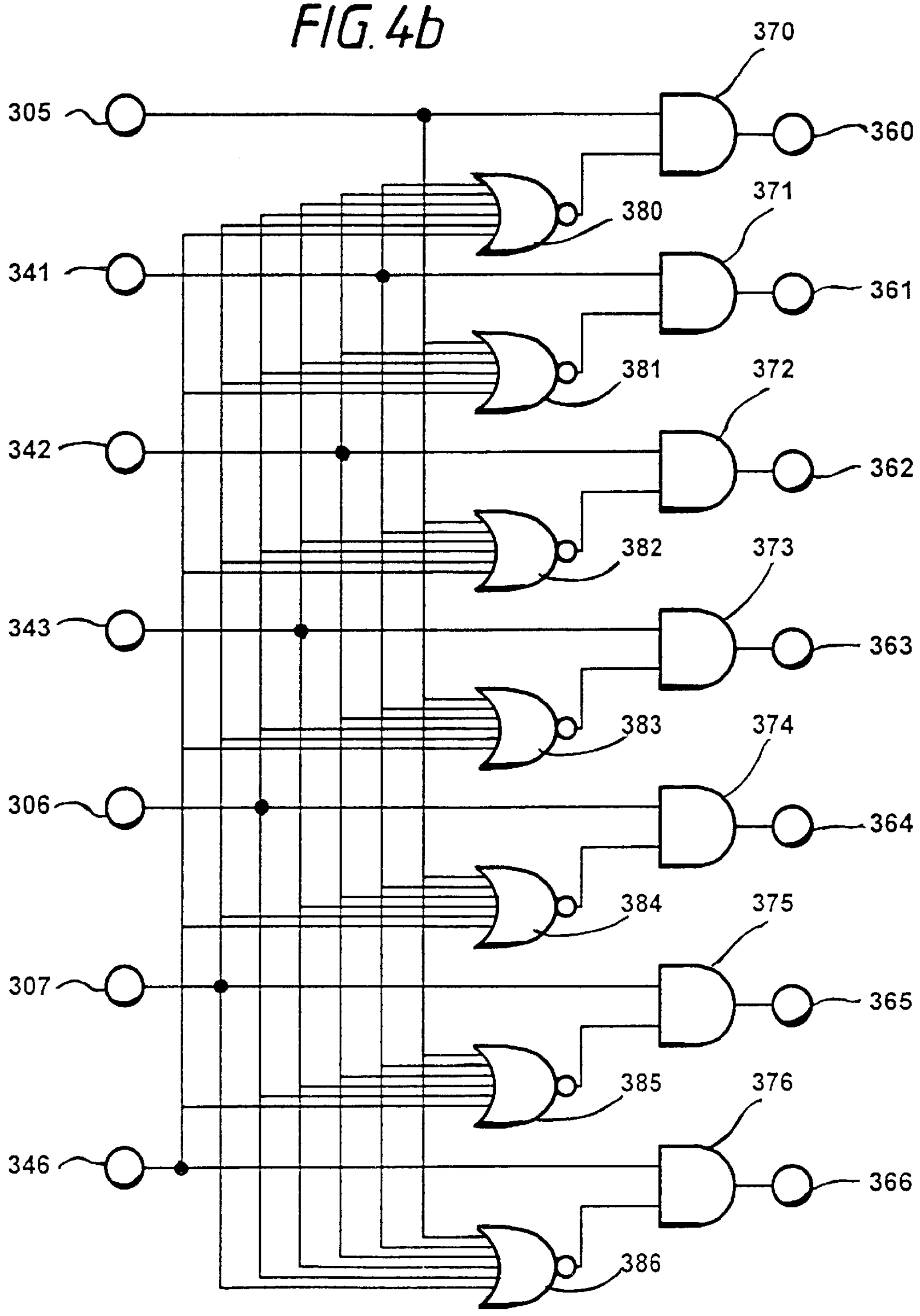

Additionally, the nodes 305–308 and 341–348 are each supplied to one terminal of a respective two input AND-gate 370–376 (nodes 347, 348 and 308, and associated circuits, are omitted from FIG. 4*b* for ease of representation). To the other terminal of the AND-gates 370–376 is connected the output of a respective multiple input NOR-gate 380–386. The input ports of each NOR-gate are connected to all of the ports 305–308, 341–343, 346–348 other than that which is connected to the associated AND-gate 370–376.

Thus, the output of each of the AND-gates 370–376 is high if, and only if, the port 305–308, 341–343, 346–348 which is connected to it is high and none of the other ports are high (i.e. the output of the NOR-gate is low). The states of the AND-gate outputs at nodes 360–366 are used to control respective relays each associated with a desired item (such as a cup of coffee with whitener and sugar). Closure of one of the relays (not shown) interconnects the respective item actuator (energised to cause dispensing of the item) with the price line terminals 305. Thus, when the user has selected an item by the desired combination of buttons, the corresponding item relay is set (and latched). When the validator energises one of its price line relays 315–318 in step 1012, power is supplied through the vending machine relay to the desired item dispense actuator and the vend is performed.

Second Embodiment

In this embodiment, many features and steps are the same as in the preceding embodiment. Where referred to, these are given the same reference numeral and will not be discussed further in detail.

In this embodiment, rather than providing the vending machine with a circuit for directly decoding the buttons pressed by the user as discussed above, the validator makes use of one or more relays provided for a different purpose, in addition to the price line relays 315–318. in combination to multiply the number of prices which can be signalled back, and the vending machine includes a logic circuit (shown in FIG. 6) to decode such relay combinations.

Figure 7:
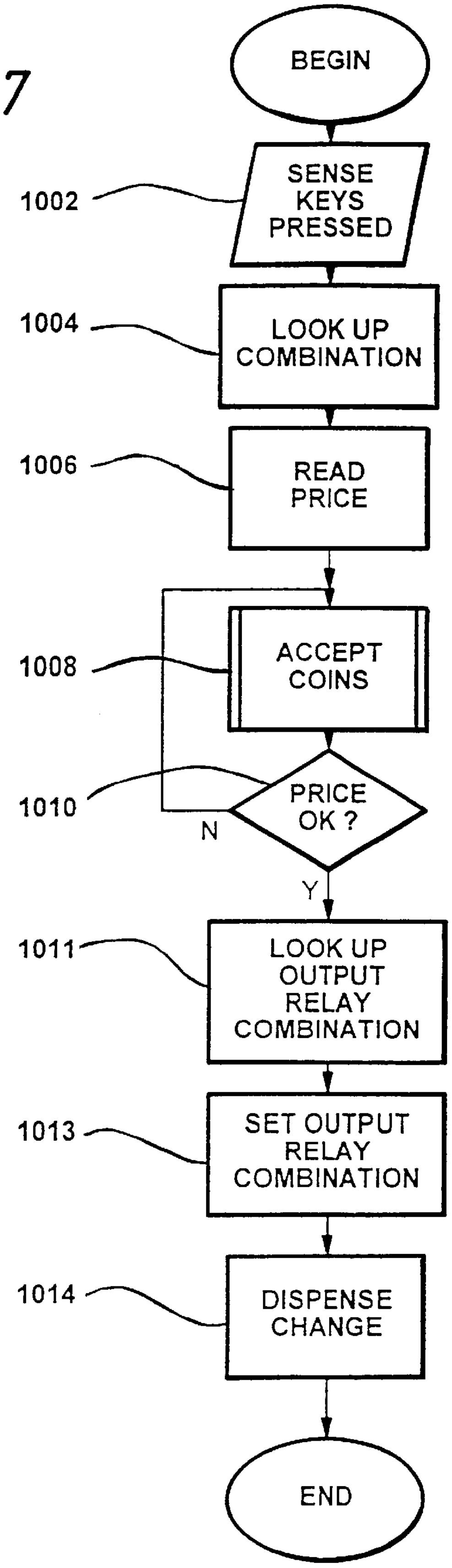
FIG. 7 is a flow diagram corresponding to that of FIG. 5 and illustrating the operation of the coin validator when using the alternate embodiment of FIG. 6.

Accordingly, referring to FIG. 7, to indicate the item to be dispensed, in step 1011 the processor 230 consults the item record for the item selected by the user and reads the output relay combination to be used. Available relays which could be used in combination with the price line relays include the exact change relay 311 and the credit relay 312; preferably the latter is used in this embodiment. Accordingly, eight possible items can be indicated, corresponding to each of four price line relays being set with the credit relay set, and each of the four price line relays being set without the credit relay being set. Conveniently, eight such combinations suffice to indicate, as disclosed in the first embodiment, coffee; coffee with sugar; coffee with whitener; coffee with sugar and whitener; tea; tea with sugar; tea with whitener; tea with sugar and whitener.

Figure 6:
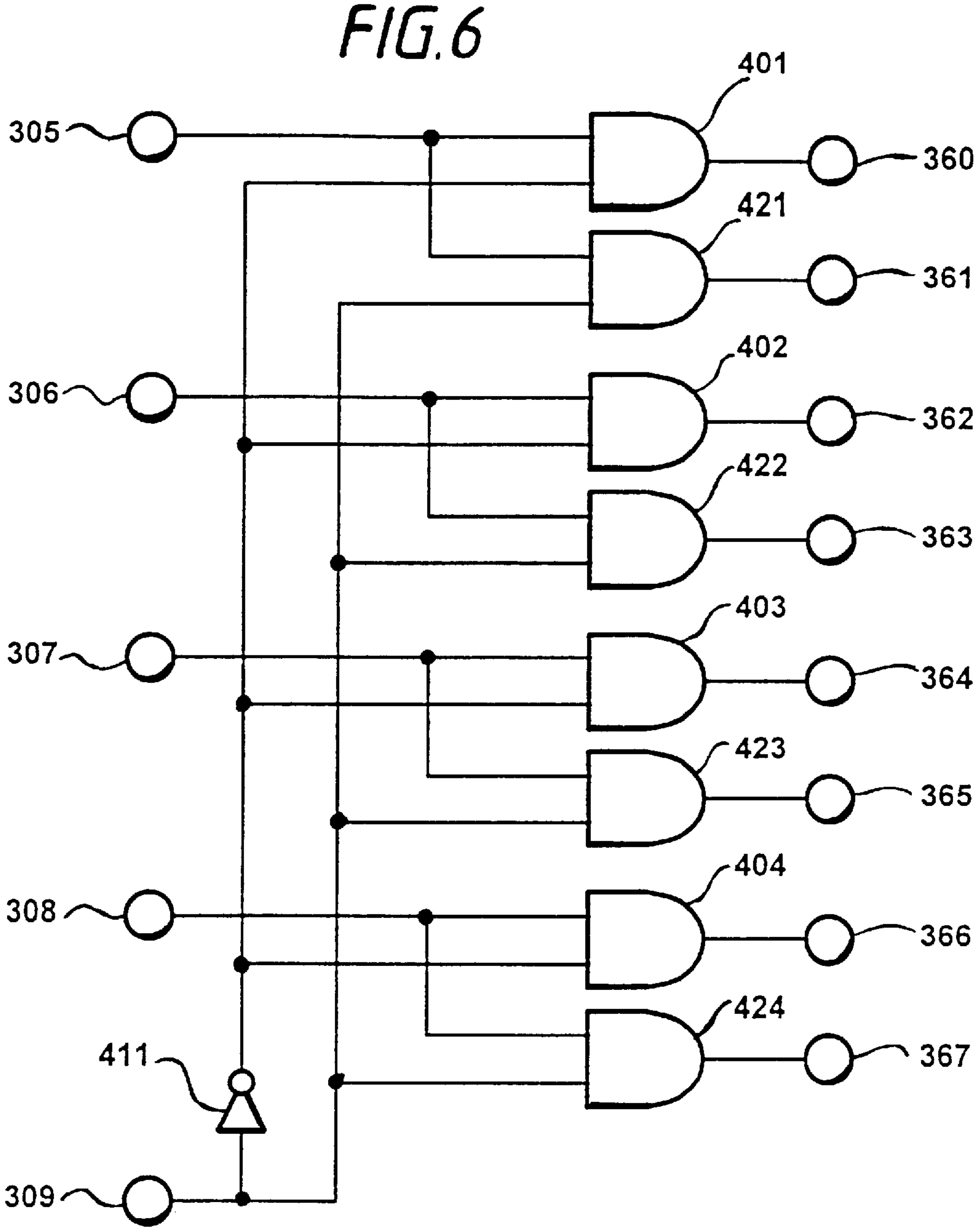
FIG. 6 is a block diagram showing another implementation of a logic circuit to be added to a conventional vending machine.

Referring to FIG. 6, within the vending machine, each of the terminals 305–308 connected to a respective price line is also connected to one input terminal of each of a pair of AND-gates 401, 421; 402, 422; 403, 423; 404, 424.

The second terminal of each first AND-gate of the pair, 401–404, is connected, via an invertor 411, to the credit relay terminal 309. The other credit relay terminal 310 is connected to the live line. Thus, the output of the first AND-gates 401–404, appearing at respective nodes 360, 362, 364 and 366 is high when the corresponding price relay 315–318 is set within the coin validator and when the credit relay 312 is not set.

The credit relay terminal 309 is connected directly to the second input ports of the second AND-gates 421–424 of each pair, the output of which (appearing at respective nodes 361, 363, 365, 367) are high when the respective price line relay 315–318 is set, and simultaneously, the credit relay 312 is set.

As in the first embodiment, the signal at each of the nodes 360–367 is used to control a relay connecting power to the selected item actuator to cause a vend.

Thus, in this embodiment, a relatively simple logic circuit which is provided to modify the operation of an existing vending machine, together with some minor modification to the operation of the validator processor 230, suffices to greatly increase the range of different items which can be dispensed.

Third Embodiment

In this embodiment, the validator is again adapted to operate with a hot beverage vending machine which is operable to dispense tea or coffee, with sugar and/or whitener. The operating program of the validator operates as in the first embodiment. The vending machine is operable to dispense a predetermined portion of either coffee, tea, sugar, or whitener, into an empty cup in response to activation of a corresponding price line 305–308 by the validator as described in relation to the first embodiment, rather than dispensing a pre-filled cup containing the desired mixture thereof as in the second embodiment.

In this embodiment, rather than providing the vending machine with circuitry to decode the button presses (as in the first embodiment) or to decode a price line/other line combination (as in the second embodiment), no adaptation to the interface within the vending machine is required.

Instead, the validator is adapted to generate sequential outputs on each of those of lines 305–308 on which button presses were detected in step 1002.

Thus, where the "coffee" button, the "sugar" button and the "whitener" button were all pressed by a user, and signals were correspondingly sensed on lines 305, 306 and 307, the validator is operable first to close relay 315 and hold it closed for a period sufficient to perform the dispensing of coffee into a cup; then to open that relay and to close relay 316 and hold it closed for a period sufficient to perform the dispensing of sugar into the cup; then to open that relay and to close relay 317 and hold it closed for a period sufficient to perform the dispensing of whitener into the cup.

Thus, at any time, only one output line is energised, but different combinations of differently priced options may be selected (allowing differential pricing of beverages or other products in combination with or without various additions), without requiring modification to the vending machine interface circuitry.

Other Embodiments

It will be apparent that it would be equally possible to use the exact change relay, which would only need to be operated for a relatively short period of time, after the user has deposited sufficient coins and before the next vend, so that no confusion to the user should be caused. Where the exact change relay is already closed (i.e. where the validator has no change to dispense) it is temporarily opened before signalling on a price line (or, alternatively, the interface circuit is made to be responsive to a state change on the 'exact change' line rather than to its state). Use of both the exact change relay and the credit relay together with the price lines provides a larger number of combinations. Additionally, instead of using these relays in combination they could simply be used as additional price lines.

Rather than using the output signals from a credit relay, or other relay, the drive signals for the relay, signals corresponding to the drive signals for the relay reed solenoids may be used instead (whether the relays themselves are physically present or absent, whether reed relays or other forms of relays are used, or indeed whether circuits other than relays are used).

It will be clear that it is not essential that the buttons should be pressed absolutely simultaneously. In the second embodiment, it would be possible simply to program the processor 230 to monitor occurrence of several buttons within a defined period of time (perhaps on the order of a second or so). In the first embodiment, modification would need to be made to the vending machine hardware of FIG. 4, to permit button presses to be latched and held for a period of, for example, a second or so, using a trigger or monostable circuit.

Rather than discrete logic gates as shown, the interface circuits described above may be implemented as a look-up table PROM, or as a low-cost microprocessor, or other integrated circuit. Rather than looking up a price for each combination of price lines, the validator may look up a price for each line (tea, sugar, whitener) and then calculate a combined price by adding the individual prices, thus allowing for differential pricing for additives.

The invention has been described in the context of coin validators, but it is to be noted that the term "coin" is employed to mean any coin (whether valid or counterfeit), token, slug, washer, or other metallic object or item, and especially any metallic object or item which could be utilised by an individual in an attempt to operate a coin-operated device or system.

What is claimed is:

1. A method of operating a money validator connected to a money-actuated machine through an interface carrying a plurality of price lines, each indicating a different price available on the money validator, comprising the steps of sensing said price lines and actuating one of said lines when sufficient money has been deposited in the validator; wherein the validator is arranged to detect at least two combinations each comprising the actuation of at least two different said price lines, and to respond differently to said combinations.

2. A method according to claim 1, in which the validator is also arranged to respond to individual actuation of one or more of said price lines.

3. A method according to claim 1, in which the validator is arranged to read, for each said combination, a stored price and to accept money to meet said price.

4. A method according to claim 1, in which the validator is arranged to read, for each said price line, a stored price; to calculate a combined price for each combination from said stored prices; and to accept money to meet said combined price.

5. A method according to claim 1, in which the validator is arranged to signal which said combination has been detected.

6. A method according to claim 1, in which the validator is arranged to actuate the plurality of said lines making up a detected combination, in sequence such that only one of said lines is activated at a time.

7. A method of operating a money validator connected to a money-actuated machine through an interface carrying a plurality of price lines, comprising the steps of sensing said price lines and actuating one of said lines when sufficient money has been deposited in the validator; wherein the validator is arranged to signal a greater number of selections than the number of said price lines, by actuating one of said price lines in combination with a further line normally usable for a different purpose.

8. A method according to claim 7, in which the further line is a credit relay line.

9. A method according to claim 7, in which the further line is an exact change line.

10. A method according to claim 7, in which the further line is normally actuated at a different time.

11. A method according to claim 7, in which the validator can only actuate one of said price lines at a time.

12. An interface circuit for a money actuated machine for connection to a money validator, said machine comprising a plurality of user-actuated selection buttons connected to corresponding price lines and means for dispensing a selected item or service in response to a signal from said money validator, comprising means for decoding at least two combinations each comprising the actuation of at least two different said price lines, and actuating said dispensing means differently in response to said combinations.

13. An interface circuit for a money actuated machine for connection to a money validator, said machine comprising a plurality of user-actuated selection buttons connected to corresponding price lines and means for dispensing a selected item or service in response to a signal from said money validator, comprising means for detecting which of a plurality of combinations of one of said price lines, in combination with a further line normally usable for a different purpose, is present.

14. An interface according to claim 13, in which the further line is a credit relay line.

15. An interface according to claim 13, in which the further line is an exact change line.

16. A method of adapting a money actuated machine comprising adding thereto an interface circuit according to claim 12.

17. A method of adapting a money validator comprising programming it to detect at least two combinations each comprising the actuation of at least two different parallel price lines, each indicating a different price available on the money validator, and to respond differently to said combinations.

18. A money validator including an interface for connecting said money validator to a money actuated machine, said machine including a plurality of user-actuated selection buttons connected to corresponding price lines and means for dispensing a selected item or service in response to a signal from said money validator, comprising:

means for decoding at least two combinations each comprising the actuation of at least two different said price lines; and means for actuating said dispensing means differently in response to said combinations.

19. A money validator including an interface for connecting said money validator to a money actuated machine, said machine including a plurality of user-actuated selection buttons connected to corresponding price lines and means for dispensing a selected item or service in response to a signal from said money validator, comprising means for detecting which of a plurality of combinations of one of said price lines, in combination with a further line normally usable for a different purpose, is present.

20. An interface according to claim 19, in which the further line is a credit relay line.

21. An interface according to claim 19, in which the further line is an exact change line.

22. A money validator connectable to a money-actuated machine through an interface carrying a plurality of price lines, said machine being adapted to sense said price lines and actuate one of said lines when sufficient money has been deposited in the validator; wherein the validator is programmable to detect at least two combinations each comprising the actuation of at least two different said price lines, and to respond differently to said combinations.

23. A money validator according to claim 22, in which the validator is also arranged to respond to individual actuation of one or more of said price lines.

24. A money validator according to claim 22, in which the validator is arranged to read, for each said combination, a stored price and to accept money to meet said price.

25. A money validator according to claim 22, in which the validator is arranged to read, for each said price line, a stored price; to calculate a combined price for each combination from said stored prices; and to accept money to meet said combined price.

26. A money validator according to claim 22, in which the validator is arranged to signal which said combination has been detected.

27. A money validator according to claim 22, in which the validator is arranged to actuate the plurality of said lines making up a detected combination, in sequence such that only one of said lines is activated at a time.

28. A money validator connected to a money-actuated machine through an interface carrying a plurality of price lines, said machine being adapted to sense said price lines and actuate one of said lines when sufficient money has been deposited in the validator; wherein the validator is programmable to signal a greater number of selections than the number of said price lines in response to actuating one of said price lines in combination with a further line normally usable for a different purpose.

29. A money validator according to claim 28, in which the further line is a credit relay line.

30. A money validator according to claim 28, in which the further line is an exact change line.

31. A money validator according to claim 28, in which the further line is normally actuated at a different time.

32. A money validator, according to claim 28, in which the validator can only actuate one of said price lines at a time.

* * * * *